United States Patent [19]

Takahashi et al.

[11] Patent Number: 4,466,006

[45] Date of Patent: Aug. 14, 1984

[54] RECORDING APPARATUS

[75] Inventors: Yuji Takahashi, Tokyo; Hisaji Masaki; Yasuhito Suzuki, both of Kawasaki, all of Japan

[73] Assignee: Canon Kabushiki Kaisha, Tokyo, Japan

[21] Appl. No.: 335,454

[22] Filed: Dec. 29, 1981

[30] Foreign Application Priority Data

Jan. 8, 1981 [JP] Japan ............................ 56-1830
Jan. 8, 1981 [JP] Japan ............................ 56-1831

[51] Int. Cl.³ .................................... G01D 15/00
[52] U.S. Cl. .......................... 346/153.1; 346/160; 355/14 SH
[58] Field of Search .............. 346/153.1, 160, 108, 346/76 L; 355/14 SH; 358/300

[56] References Cited

U.S. PATENT DOCUMENTS 4,260,904 4/1981 Horie et al. .................... 355/14 SH Primary Examiner—Thomas H. Tarcza
Attorney, Agent, or Firm—Fitzpatrick, Cella, Harper & Scinto

[57] ABSTRACT

A recording apparatus in accordance with the invention has an optical system including a laser oscillator for forming an electrostatic latent image of an original on a photosensitive drum, a developing unit for visualizing the image, a tray for stacking transfer sheets, a transfer charger for transferring the image onto a transfer sheet, a fixer for fixing the image on the transfer sheet, a double transfer detector for detecting double transfer of two or more transfer sheets, a ramp detector for detecting a ramp of the transfer sheet, and a central processing unit for inhibiting feeding of the transfer sheet upon sensing of a double transfer or ramp of transfer sheets. When a double transfer or ramp of transfer sheets occurs, the information which may normally be lost may be printed on a transfer sheet in the right order without requiring interruption of the operation of the recording apparatus, so that the throughput of the recording apparatus may not be degraded.

32 Claims, 21 Drawing Figures

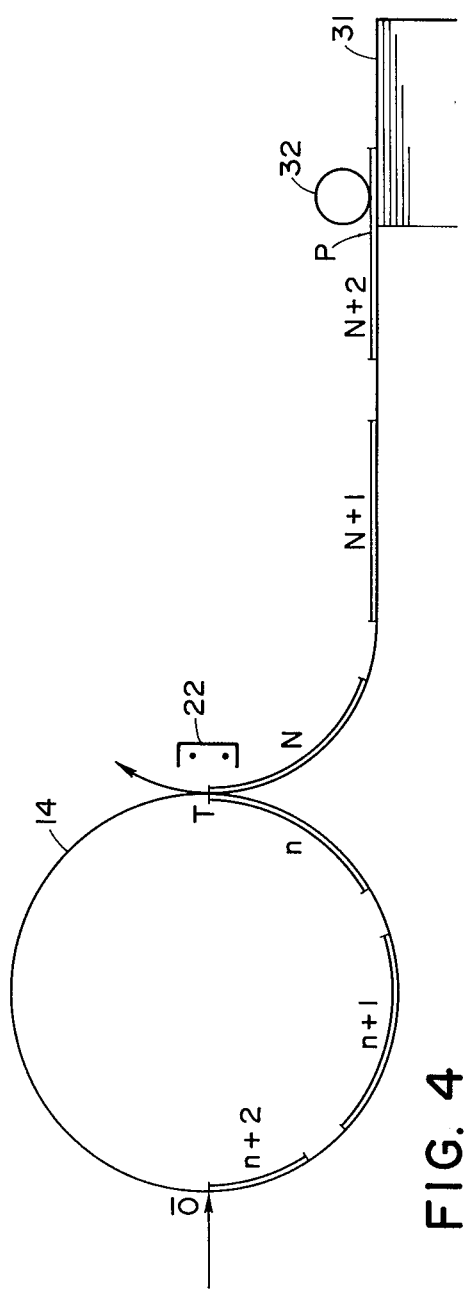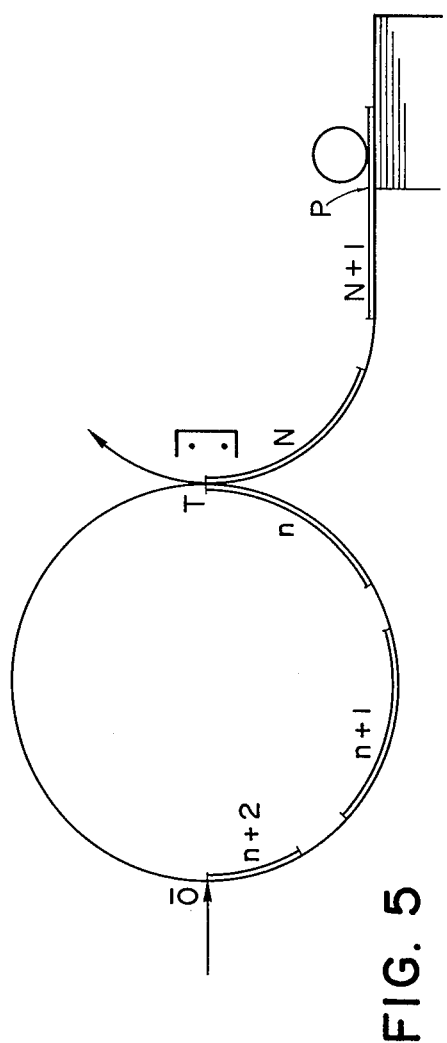
FIG. 4
FIG. 5

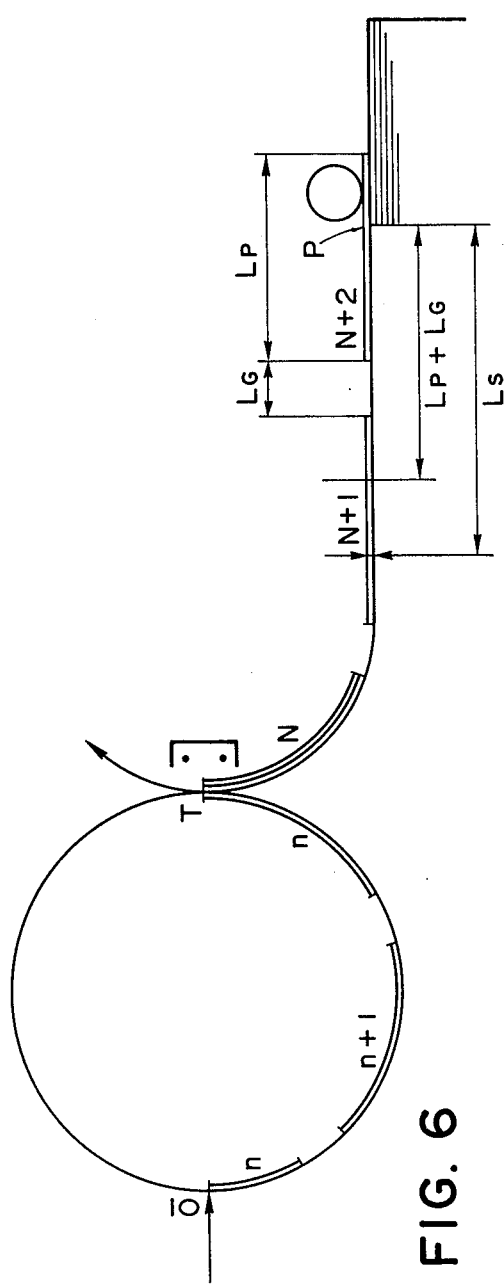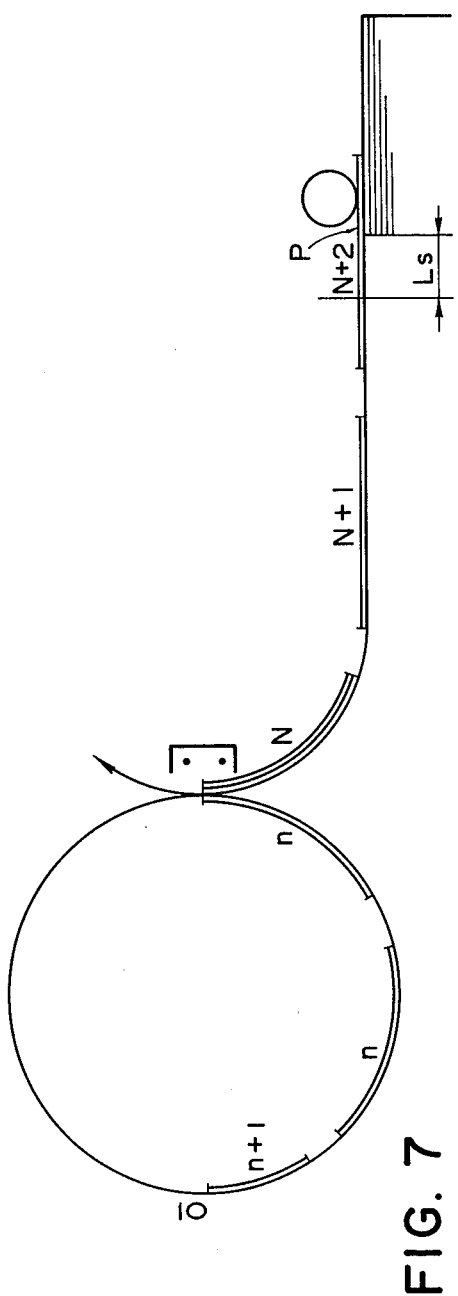
FIG. 6
FIG. 7

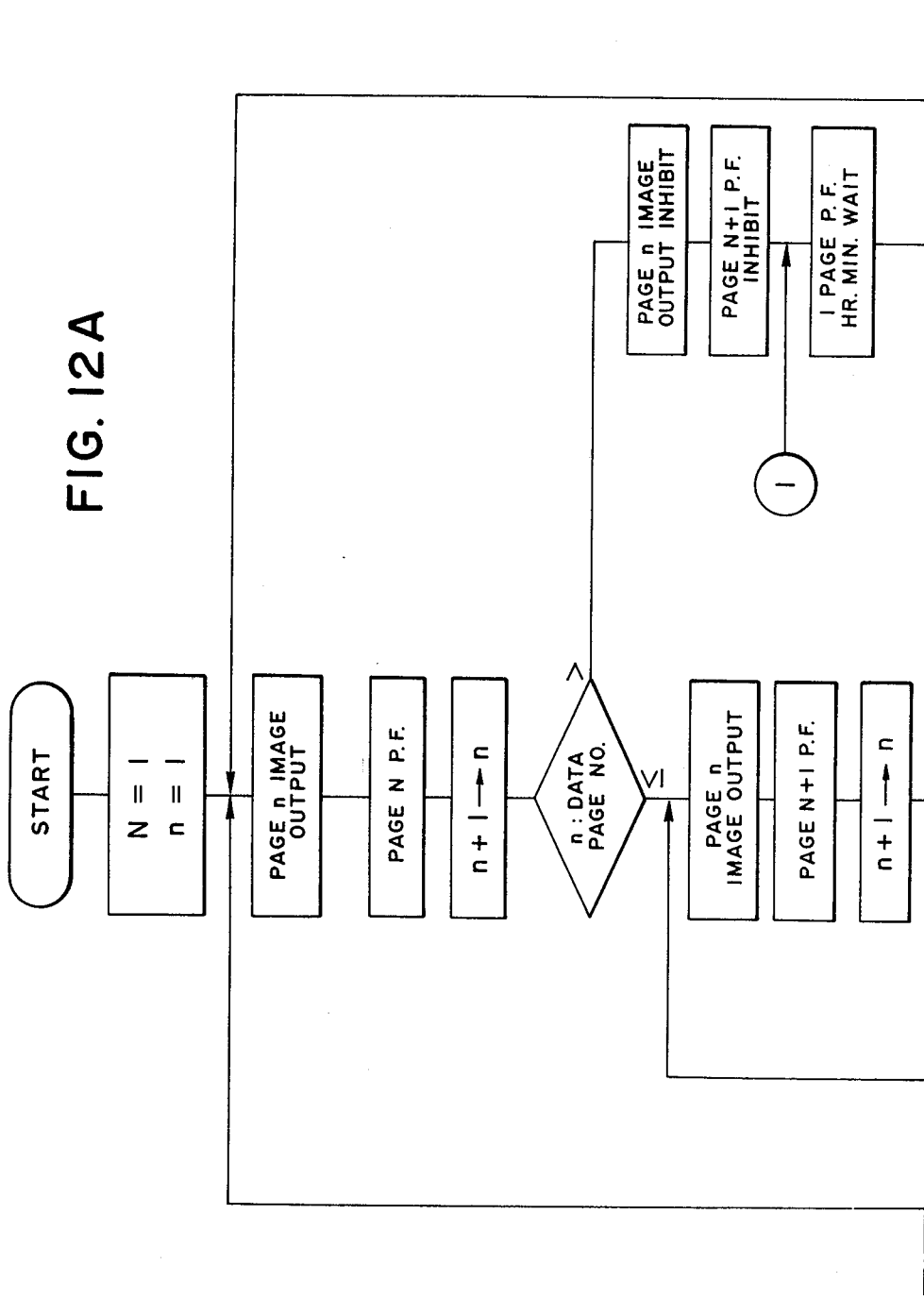

RECORDING APPARATUS

BACKGROUND OF THE INVENTION

1. Field of the Invention

The present invention relates to a recording apparatus such as a laser beam printer (to be referred to as an LBP for brevity hereinafter) and, more specifically, to a recording apparatus which can eliminate dropping of pages or disturbance of the order of pages when the paper sheets (to be referred to as sheets hereinafter) are transferred two or more at a time or ramped.

2. Description of the Prior Art

Recording apparatus such as LBPs can continuously form images on a photosensitive body. Therefore, if the distance between the sheets is reduced to a minimum during the conveying, the maximum number of printed sheets may be obtained within a given period, so that the printing time may be significantly reduced. With such a recording device, even if a trouble occurs during the step of conveying the sheets such as jamming, a double transfer in which more than one sheet are fed together, a ramp sheet transfer (or simply a "ramp") and so on, it is preferable that the throughput (of the number of printing sheets per unit time) of the printer not be reduced. When jamming occurs, the printer must, in general, be immediately stopped and the jammed sheet must be removed. However, when a double transfer or ramp occurs, this does not necessarily result in jamming. Therefore, if a separate tray is incorporated to receive the double-transferred or ramped sheet, the printing operation need not be interrupted and be continued. However, if the double-transferred sheet or ramped sheet is simply exhausted to the separate tray, the information printed on such a double-transferred or ramped sheet inadvertently drops out and this dropped piece of information must be supplemented afterwards.

SUMMARY OF THE INVENTION

It is an object of the present invention to provide a recording apparatus which overcomes certain of the drawbacks of conventional recording apparatus and which reduces the decrease in the throughput of the apparatus when an abnormal sheet conveying condition occurs that does not require interruption of the operation of the apparatus.

It is another object of the present invention to provide a recording apparatus which is capable of automatically supplementing dropped out piece of information due to an abnormal sheet conveying condition in such a manner that the order of printing out of the information is not disturbed.

The above and other objects of the present invention will become more clear from the following description when taken in conjunction with the accompanying drawings.

BRIEF DESCRIPTION OF THE DRAWINGS

FIG. 2 is a partial, enlarged sectional view of the LBP;

FIGS. 3-1 and 3-2 are block diagrams showing the control circuitry of the LBP;

FIGS. 4 to 9 are views showing the conveying path of the LBP from the sheet feeding section to the photosensitive drum;

DETAILED DESCRIPTION OF THE PREFERRED EMBODIMENTS

Figure 1:
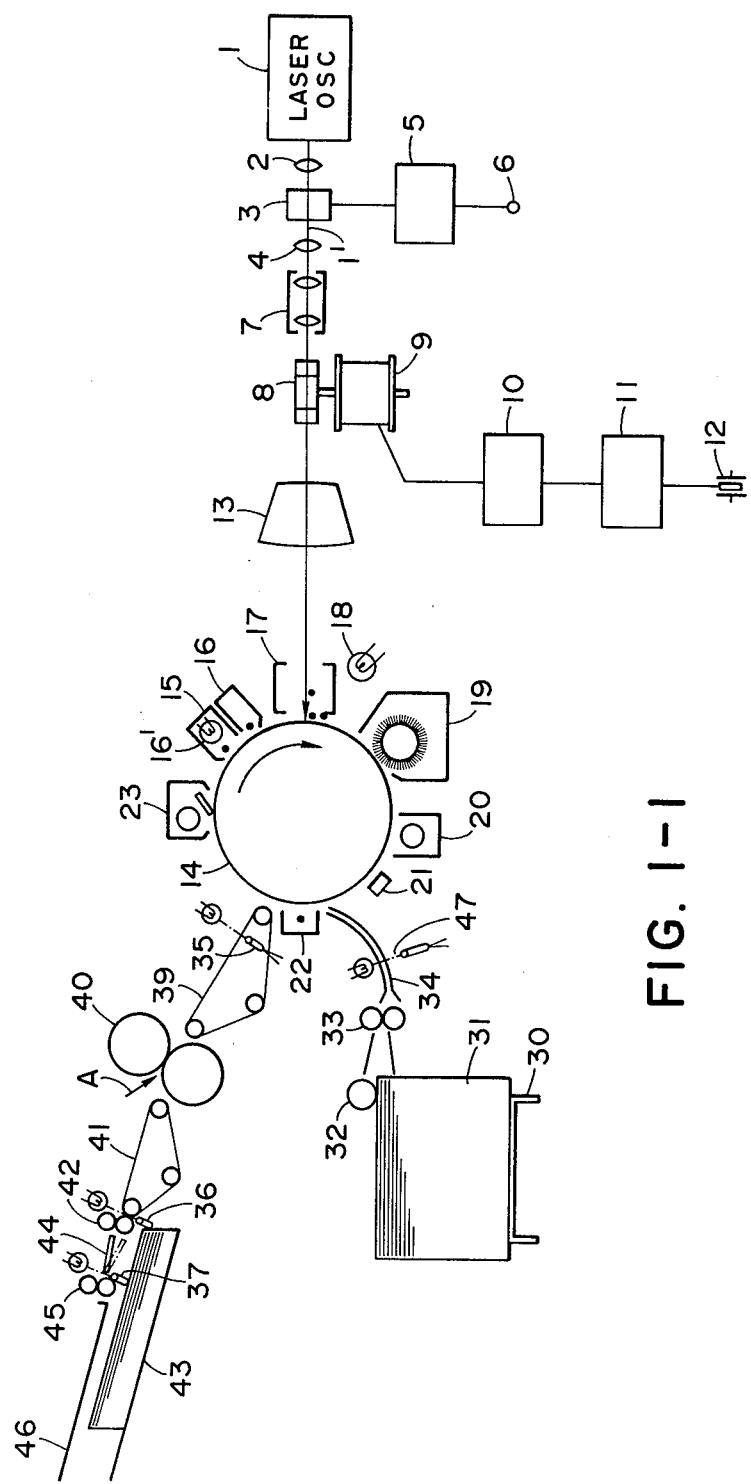
FIGS. 1—1 and 1-2 are schematic views showing the constructions of LBPs according to the present invention.

FIG. 1—1 shows the basic construction of an LBP. A laser beam generated by a laser oscillator 1 is radiated into a light modulation system which consists of a lens 2, an A/O modulation element 3 utilizing known acoustic/optical effects, and a lens 4. The lens 2 serves to focus the laser beam on the black reflecting surface in the A/O modulation element 3. The lens 4 serves to convert into parallel beams the light diffracted and dispersed by the black reflecting surface.

If an E/O modulation element utilizing the known electrooptic effects is used in place of the A/O modulation element 3, the lenses 2 and 4 may be omitted. If the laser oscillator 1 comprises a gas laser which is capable of current conversion, the light modulation system as described above may be omitted.

The laser beam radiated on the lens 4 is converted into parallel beams to become incident on a beam expander 7 which enlarges the diameter of each parallel beam without deflection.

The parallel beams of enlarged diameter then become incident on a polyhedral rotary mirror 8. The polyhedral rotary mirror 8 is mounted on a shaft which is supported by a bearing of high precision (e.g., an air bearing) and is driven by a motor 9 of constant rotational frequency (e.g., a hysteresis synchronous motor or DC servomotor). The beams which are horizontally swept by the polyhedral rotary mirror 8 are focused on a photosensitive drum 14 as a spot by an imaging lens 13 having f-$\theta$ characteristics. With a typical imaging lens, relation (1) below is satisfied:

$$r = f \cdot \tan\theta \quad (1)$$

where $\theta$ is the angle of incidence of the light beam, r is the position on the imaging surface at which the image is formed, and f is the focal length of the imaging lens. If the polyhedral rotary mirror 8 is rotated at a constant frequency as in the case of this embodiment, the angle of incidence of the reflected laser beam (52 in FIG. 2) on the imaging lens 13 linearly changes as a function of time. Therefore, the displacement velocity of the spot on the photosensitive drum 14 as an imaging surface changes nonlinearly and is not fixed. That is, the displacement velocity of the spot increases as the angle of incidence increases. If an attempt is made to turn on the beams to draw an array of spots on the photosensitive drum 14 at a constant pitch, the pitch at both ends of the array becomes greater than at the center.

In order to prevent this problem, the imaging lens 13 is designed to satisfy the relation:

$$r = f \cdot \theta \quad (2)$$

The imaging lens 13 which satisfies this relation will be referred to as an f-$\theta$ lens. In order to focus the parallel light beams into a spot by an imaging lens, the minimum diameter dmin of the spot is given by:

$$dmin = f\lambda/A \quad (3)$$

where f is the focal length of the imaging lens, λ is the wavelength of the light used, and A is the aperture of the imaging lens. A smaller dmin is obtained when A is increased if f and λ remain constant. The beam expander 7 described above is used to achieve this effect. Therefore, the beam expander 7 may be eliminated if the desired dmin is obtainable with the beam diameter of the laser oscillator.

The laser beam (52 in FIG. 2) which is deflected and modulated in this manner is radiated on the photosensitive drum 14 to form an electrostatic latent image thereon. The formed image is visualized by the electrophotographic process, transferred to a paper sheet, and is fixed to provide a hard copy. An example of the electrophotographic process which may be used in this embodiment is described in Japanese Patent Publication No. 23,910/67 of the present applicant. According to this prior art technique, the surface of the insulating layer which basically consists of an electrically conductive support layer, a photoconductive layer, and an insulating layer is uniformly charged negatively or positively by a primary corona charger 16 in advance. Charge of opposite polarity to that of the corona charge is trapped at the interface between the photoconductive layer and the insulating layer or inside the photoconductive layer. When the laser beam is radiated on the surface of the charged insulating layer while simultaneously radiating a corona discharge by an AC corona discharger 17, the entire surface of the insulating layer is exposed by an entire exposure lamp 18 to the pattern of the surface potential difference which corresponds to the dark-bright pattern of the laser beam to thereby form an electrostatic latent image of high contrast thereon. Then, the electrostatic latent image is developed for visualization by a developer containing as the main component charged colorant particles. Thereafter, with a transfer charger 22, the visualized image is transferred to the paper sheet which is tightly held onto the photosensitive drum 14 by a means to be described later. The transferred image is then fixed by a fixing means to be described later to provide an electrophotographically printed image. After the transfer, the surface of the insulating layer is cleaned by a cleaner 23 to remove the remaining charged particles so that the photosensitive drum 14 may be repeatedly used.

The electrophotographic electrostatic latent image forming process as described in Japanese Patent Publication No. 19,748/67 of the present applicant is another example. According to this technique, the photosensitive plate essentially comprises an electroconductive layer, a photoconductive layer, and an insulating layer. The surface of the insulating layer is uniformly charged negatively or positively by the primary corona charge. The charge of a polarity opposite to that of the primary corona charge is trapped in the interface between the photoconductive layer and the insulating layer or inside the photoconductive layer. The AC corona charge is applied to the surface of the charged part to attenuate the charge on the surface of the insulating layer. Then, the laser beam as information signals is radiated to form an electrostatic latent image according to the dark-bright pattern of the laser beam on the surface of the insulating layer. The following steps for forming the electrostatic latent image are the same as in the case described above.

Figures 1, 2:
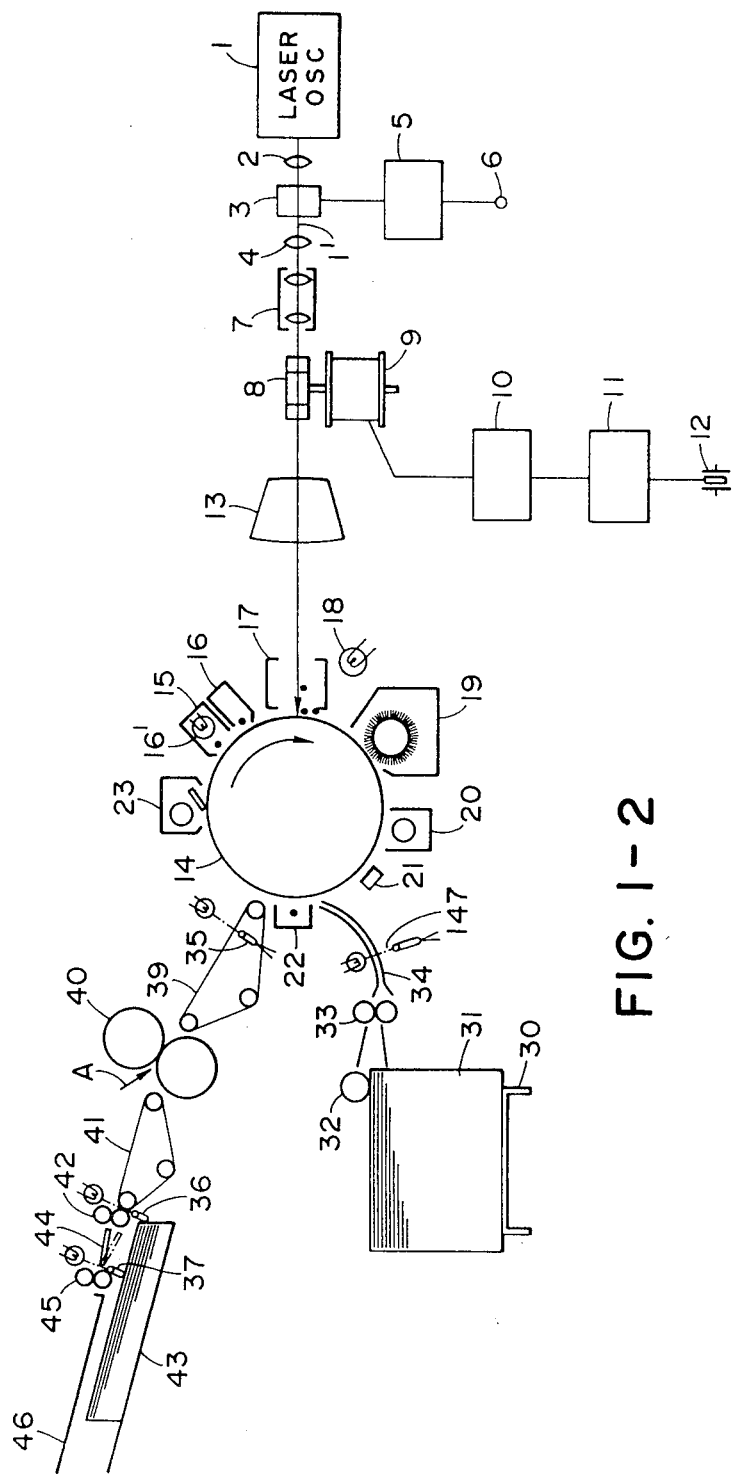
Figure 2:
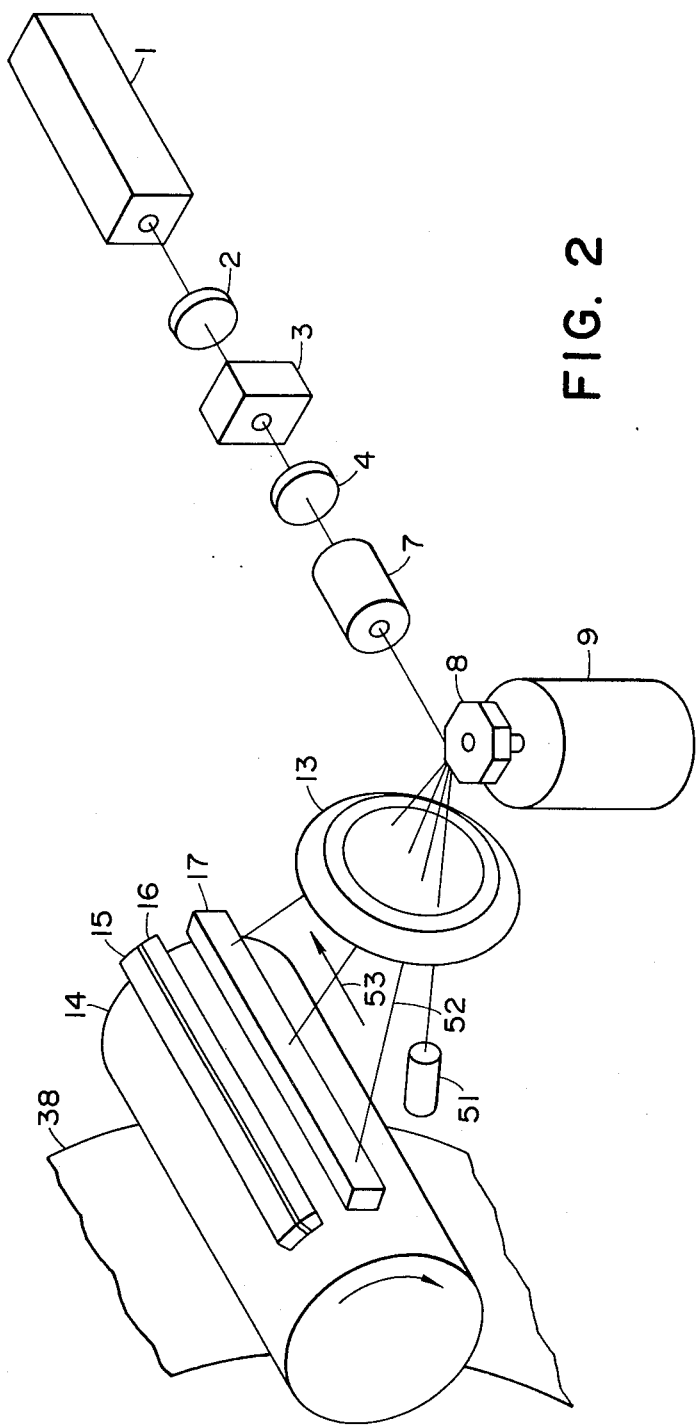

Referring to FIGS. 1—1 and 1-2, a precharge removal charger 15 keeps the surface potential of the photosensitive drum 14 constant and uniform. A preexposure lamp 16' serves to keep the characteristics of the photosensitive layer constant and uniform. The charger 15 and the lamp 16' cooperate together to cancel the preceding history of the photosensitive drum 14 that is the surface potential, after the cleaner 23, so that a stable image may be obtained constantly.

The present applicant has proposed a method for stabilizing the electrostatic latent image as a means to obtain a constantly stable and excellent image in the electrophotographic process which is to be adopted according to this embodiment. An electrostatic potentiometer 21 measures the electrostatic potentials at the bright part of the photosensitive drum 14, that is, the part scanned and exposed to the laser beam, and at the dark part.

A carrier remover 20 prevents attraction of carriers in the developer in the developing unit 19 to the photosensitive drum 14 or mixing of these carriers in the cleaner 23.

FIG. 2 shows the three-dimensional arrangement of the optical system shown in FIG. 1—1. The same reference numerals as in FIG. 1 denote the parts having the same functions. (This also will be applicable to the figures to be described hereinafter unless otherwise indicated.).

Referring to FIG. 2, a beam detector 51 comprises a small slit and a photoelectric transducer element of fast response time (e.g., a p-i-n diode). The beam detector 51 detects the scanning initiating position of a laser beam 52 which is swept by the rotating mirror 8. According to the detection signal generated by the beam detector 51, the timing is determined of generation of a modulation control signal for providing desired light information on the photosensitive drum 14 in the manner to be described below.

Referring still to FIG. 2, the scanning direction of the laser beam is indicated by an arrow 53.

Conveying operation of the sheet will now be described below with reference to FIGS. 1—1 and 1-2. When sheets 31 stacked on a paper feed stage 30 are supplied to the conveying path by a paper feed roller 32, any ramp occurring during feeding operation is corrected by a pair of register rollers 33 and the leading ends of the sheets 31 are also aligned. The sheets 31 passing between the register rollers 33 are brought into contact with the photosensitive drum 14 through a conveying guide 34 which defines part of the conveying path. A double transfer sensor 47 is arranged in the conveying path to detect whether or not a double transfer of sheets 31 occurs. The image formed on the photosensitive drum 14 is transferred onto the sheet 31 by the transfer charger 22. The sheet 31, after the transfer, is separated from the photosensitive drum 14 by a separating means (not shown) to be supplied to a conveyor belt 39. A photosensor 35 is arranged in the region of the conveyor belt 39. By the output signal from the photosensor 35, jamming in the conveying path from the paper feed roller 32 to the photosensitive drum 14 is detected. The sheet 31 is further conveyed by the conveyor belt 39 to reach a fixer 40. The toner on the sheet 31 is melted by the heat and pressure of the fixer 40 and forms a toner image. The sheet 31, after fixing, is conveyed by another conveyor belt 41. Any jamming occurring in the conveying path between photosensors 35 and another photosensor 36 is detected by the photosensor 35 and the photosensor 36 which are arranged before exhaust rollers 42. A sheet which is conveyed normally is stacked on a first output tray 43 through the exhaust rollers 42.

When a double transfer is detected by the double transfer sensor 47 to be described later, the sheets are detected by the photosensor 36. Then, a paper exhaust switching plate 44 is switched to the position indicated by broken lines, and the sheets detected to be abnormally fed are stacked on a second output tray 46 through paper exhaust rollers 42 and 45. A photosensor 37 is arranged immediately before the paper exhaust rollers 45. This photosensor 37 detects if the abnormal sheet is conveyed to the second output tray 46 without failure. The double transfer sensor 47 detects a double transfer by the amount of light transmitted through the sheet.

Figures 1, 3:
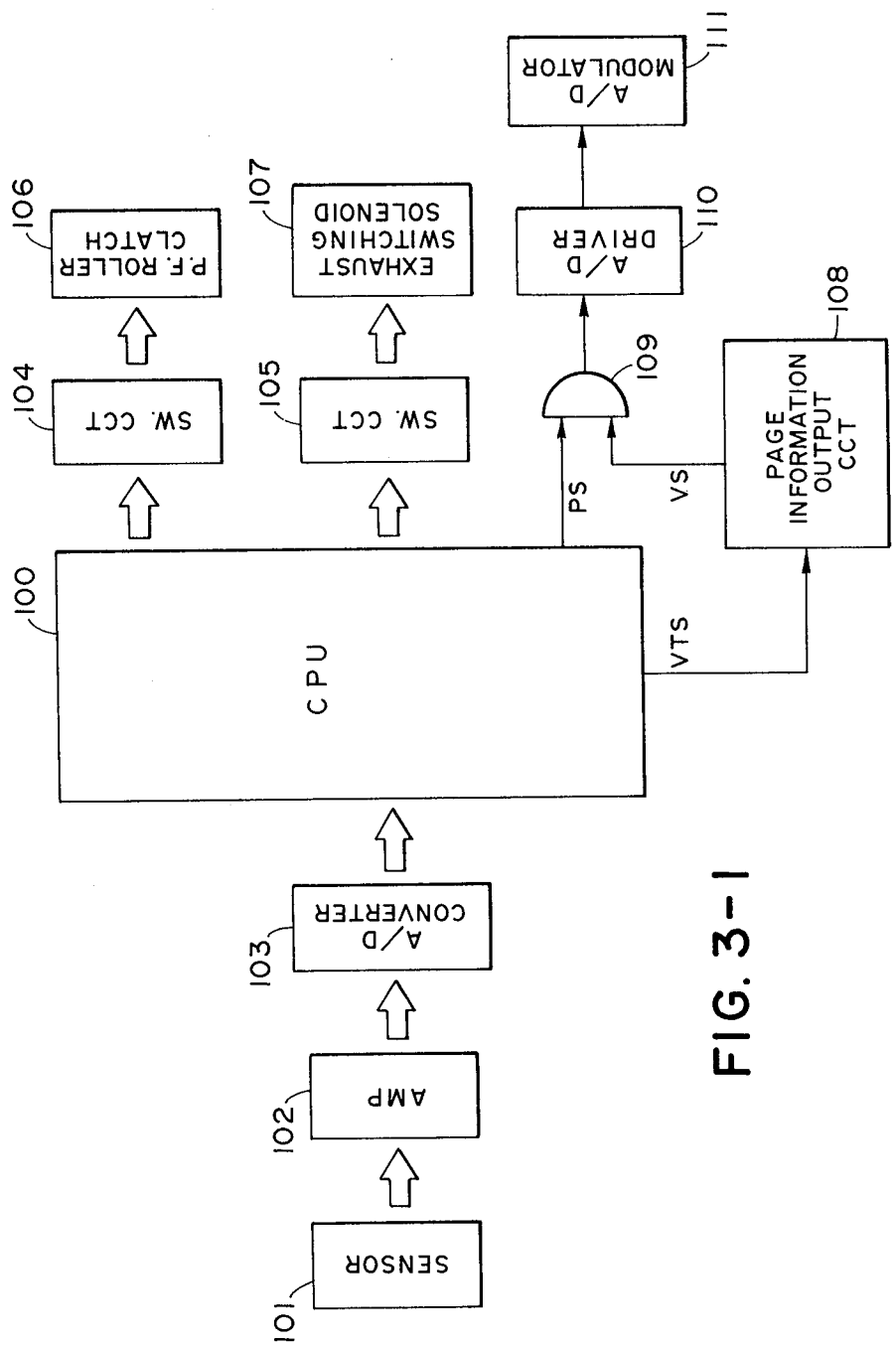
Figures 2, 3:
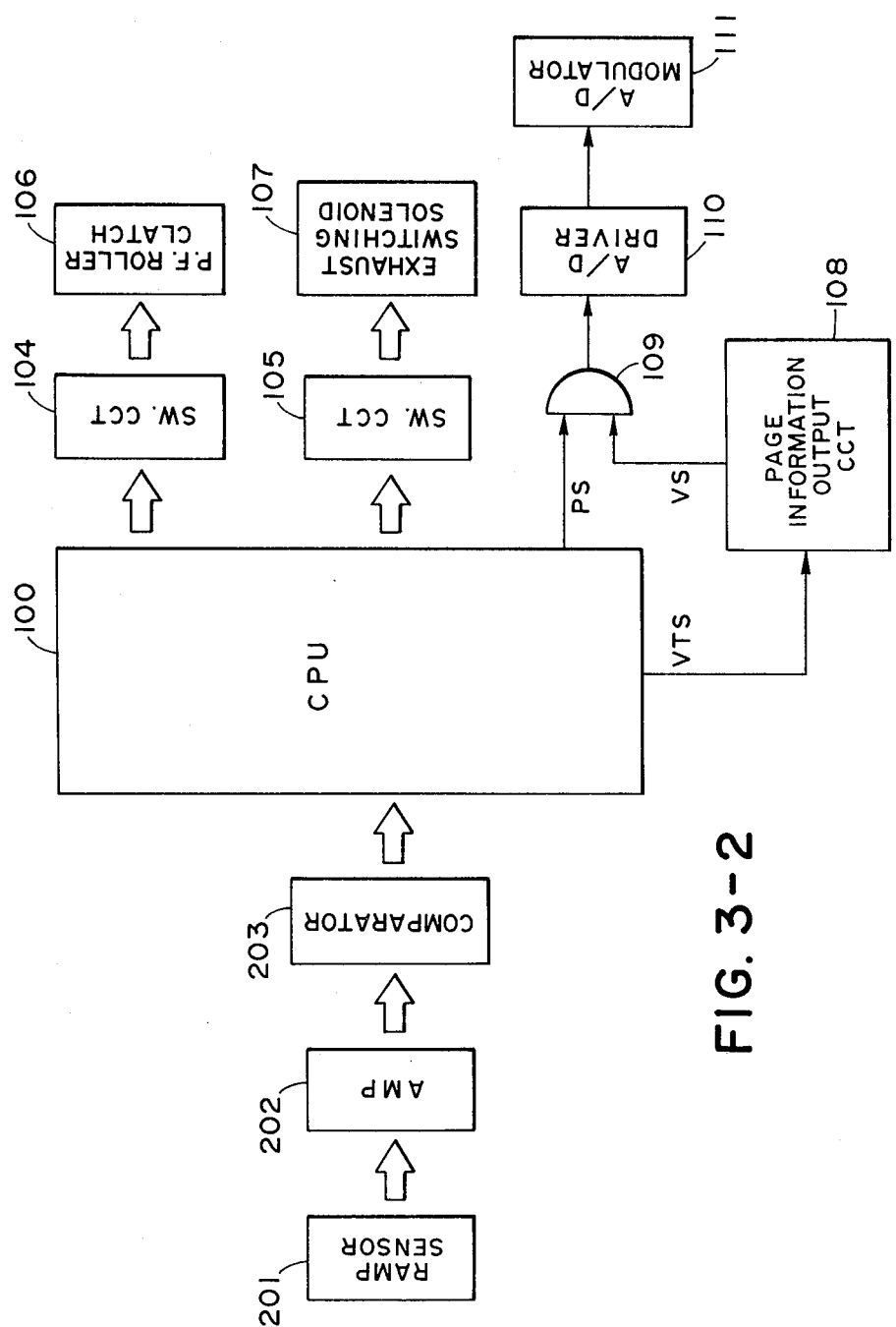

FIG. 3-1 is a block diagram showing the control circuitry of the LBP. A central processing unit (to be referred to as a CPU hereinafter) 100 controls the operation of the LBP according to a program stored in a ROM (not shown). The CPU 100 may comprise a known microcomputer including ROMs and RAMs, for example, an M6800 available from Motorola. A double transfer sensor 101 corresponds to the double transfer sensor 47 shown in FIG. 1. The signal from the double transfer sensor 101 is amplified by an amplifier 102, digitalized by an A/D converter 103, and is input to the CPU 100. A drive signal from the CPU 100 is output to a paper feed roller clutch 106 and a paper exhaust switching solenoid 107 through switching circuits 104 and 105 to drive the paper feed roller 32 and the paper exhaust switching plate 44. The CPU 100 outputs an image write timing signal VTS to a page information output circuit 108.

A video signal VS from the page information output circuit 108 and a permission signal PS from the CPU 100 are output to an AND gate 109, the output of which is input to an A/O modulator 111 (corresponding to the A/O modulation element 3 shown in FIGS. 1—1 and 1-2) through an A/O driver 110 (corresponding to the A/O driving element 5 shown in FIGS. 1—1 and 1-2). Then, the A/O modulator 111 is turned on and off according to the video signal.

FIGS. 4 to 9 show the conveying path from the paper feed section to the photosensitive drum. Referring to FIG. 4, an image writing position on the photosensitive drum 14 is represented by O, the image transfer position is represented by T, and the leading end of each sheet 31 at the paper feed stage 50 which comes into contact with the paper feed roller 32 is represented by P. The sheets are fed in the order of N, N+1, N+2, and so on, and the page information on the image is written on the photosensitive drum 14 in the order of n, n+1, n+2, and so on. The distance on the photosensitive drum 14 from the image writing position O to the image transfer position T is represented by $L_1$, and the conveying distance from the leading end P of the sheet 31 to the image transfer position T is represented by $L_2$.

If $L_1 \leq L_2$ as shown in FIG. 4, in order that the leading end of the image and the leading end of the sheet coincide at the image transfer position T, the paper feeding is performed first and the image writing is performed next.

If $L_1 \leq L_2$ as shown in FIG. 5, in order that the leading end of the image and the leading end of the sheet coincide at the image transfer point T, the image writing is performed first, and the paper feeding is performed next.

The distance between the leading ends of continuously fed sheets may be given by $L_P + L_G$ where $L_P$ is the length of the sheet along the direction of its movement and $L_G$ is the paper feeding distance between the sheets.

Control operation in the case of a double transfer will be described with reference to the position of the double transfer sensor and the page information written on the photosensitive drum 14 referring to the flow charts shown in FIGS. 6 to 9 and 10 to 13 and the timing charts shown in FIGS. 14 to 17.

Figure 10:
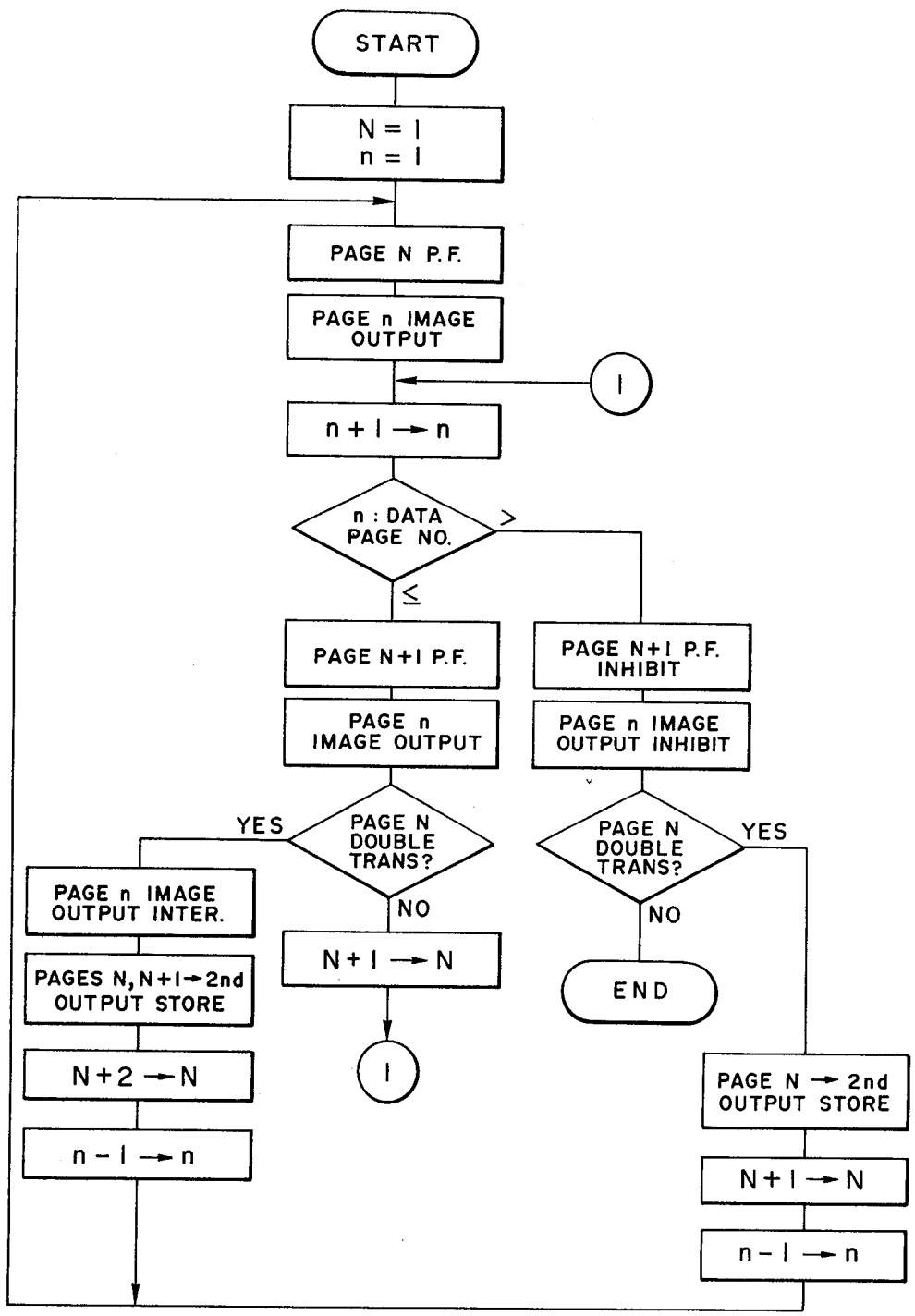
FIGS. 10 to 13 are control flow charts.
Figure 14:
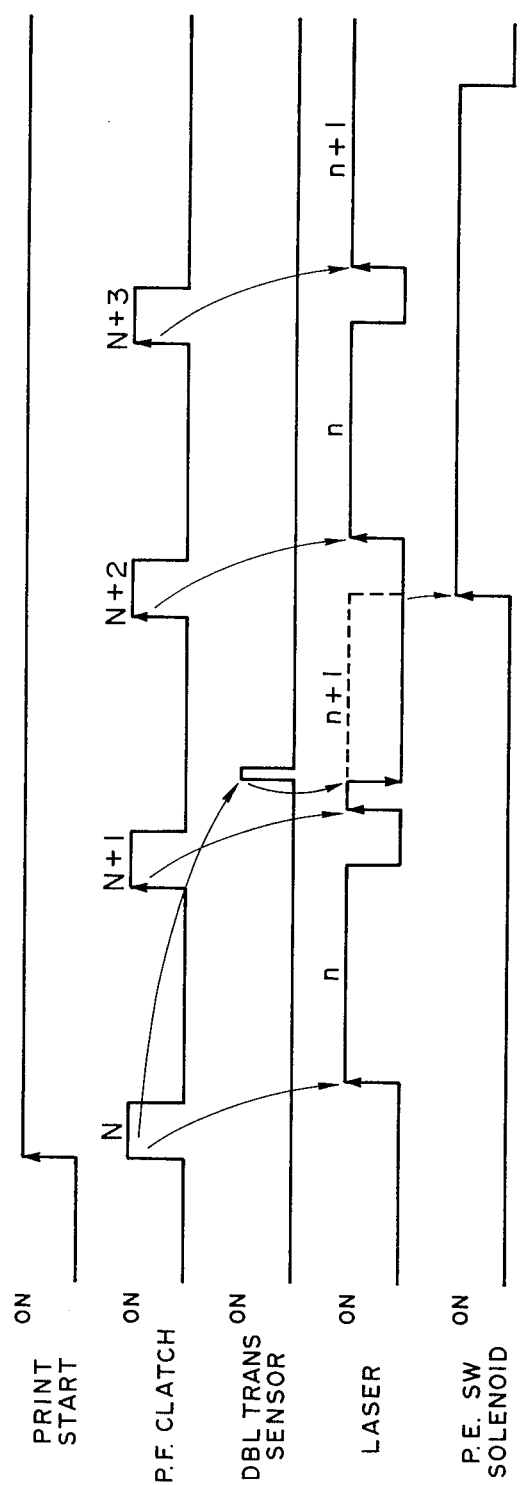
FIGS. 14 to 17 are timing charts.

As shown in FIG. 6, if a double transfer with the Nth sheet occurs in the conveying path which satisfies the relations $L_1 \leq L_2$ and $L_P + L_G \leq L_S$ where $L_S$ is the distance between the leading end P of the sheet and the double transfer sensor 47, the feeding of the (N+1)th sheet is already started as seen from the flow chart shown in FIG. 10 and the timing chart shown in FIG. 14. The information on the (n+1)th page is already being written on the photosensitive drum 14. Therefore, when the Nth sheet is exhausted to the second output tray 46 and the (N+1)th sheet which is not detected to be double-transferred is exhausted to the first output tray 43, the information on the nth page drops from the printed sheets. Even if the information corresponding to the nth page is printed on the (N+2)th sheet, the order of sheets is disturbed and becomes (n−1), (n+1) and n.

In order to prevent the dropout of the page and disturbance of the order of pages, if a double transfer occurs with the Nth sheet, the (N+1)th sheet is also exhausted to the second output tray 46 and the information on the nth page is printed on the (N+2)th sheet. In this manner, the dropout of the page and the disturbance of the order of pages may be prevented. More specifically, when the double transfer sensor 101 (47) detects a double transfer and the output signal therefrom goes to high level, the permission signal PS from the CPU 100 goes to low level, so that the video signal VS from the page information output circuit 108 is not supplied to the A/O modulator 111 (3). When the photosensor 36 detects the double-transferred sheet, the CPU 100 produces a drive signal which turns on the paper exhaust switching solenoid 107 through the switching circuit 105. Then the paper exhaust switching plate 44 is switched to the position indicated by the broken line shown in FIG. 1, so that the Nth and (N+1)th sheets are exhausted to the second output tray 46. When the paper feed roller clutch 106 is turned on and the (N+2)th sheet is fed, the permission signal PS goes to high level at a predetermined time to output the information on the nth page to the A/O driver 110 (5) through the AND gate 109 from the page information output circuit 108. Then, the A/O modulator 111 (3) modulates the laser beam to write the information on the nth page on the photosensitive drum 14. The sheet to which is transferred the image at the image transfer position T is exhausted to the first output tray 43. During this operation, the paper exhaust switching solenoid 107 is kept off and the paper exhaust switching plate 44 is at the position indicated by the solid line shown in FIG. 1. Thereafter, the information on the (n+1)th page is transferred to the (N+3)th sheet.

Figure 11:
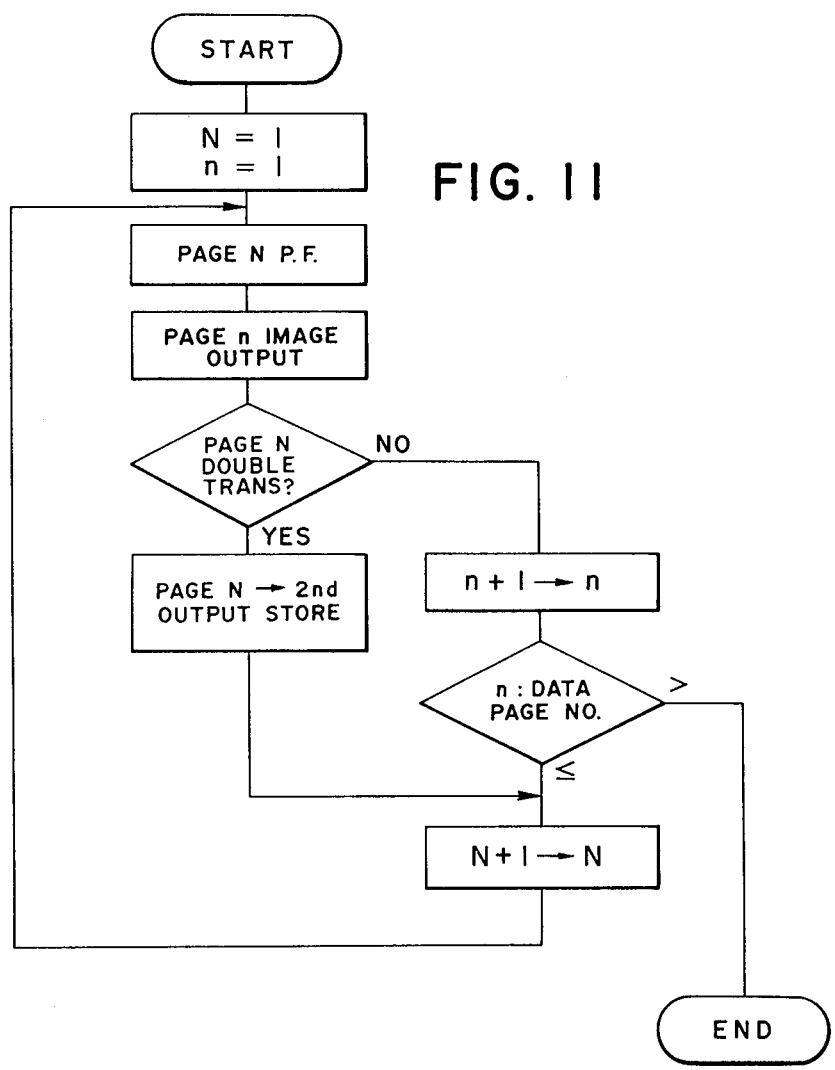
Figure 15:
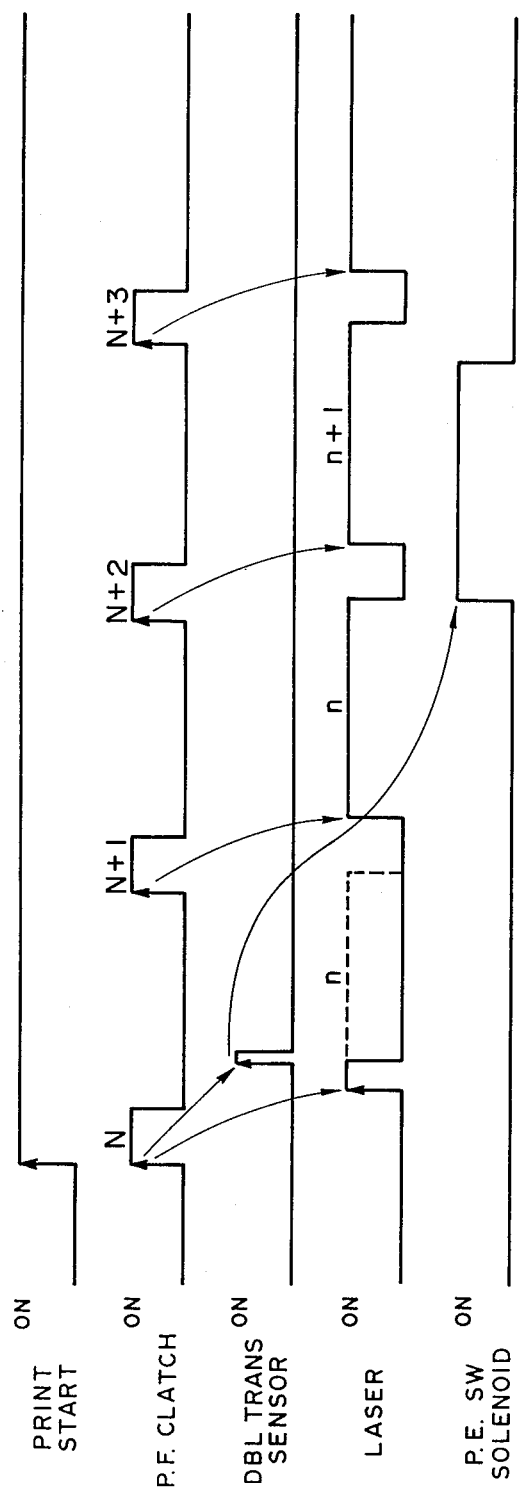

The operation will now be described with reference to a case wherein a double transfer occurs with the Nth sheet in the conveying path shown in FIG. 7 which satisfies the relations $L_1 \leq L_2$ and $L_P + L_G > L_S$, by referring to the flow chart shown in FIG. 11 and the timing chart shown in FIG. 15. At the instant when the double transfer sensor 101 (47) detects a double transfer, the information on the nth page is being written on the photosensitive drum 14. Therefore, it is necessary to output the information on the nth page to the (N+1)th sheet in place of the information on the (n+1)th page. At the leading edge of the output signal from the double transfer sensor 101 (47), the permission signal PS goes to low level so that the video signal VS may not be output to the A/O modulator 111 (3). When the paper feed clutch 106 is turned on and the (N+1)th sheet is fed, the information on the nth page is written on the photosensitive drum 14 at a predetermined time and is transferred to the (N+1)th sheet. In the same manner, the information on the (n+1)th page is transferred to the (N+2)th sheet, the information on the (n+2)th page is transferred to the (N+3)th sheet and so on. When the photosensor 36 detects a double-transferred sheet after the leading edge of the output signal from the double transfer sensor 101 (47), the paper exhaust switching solenoid 107 is turned on, and the Nth sheet is exhausted to the second output tray 46.

Figure 8:
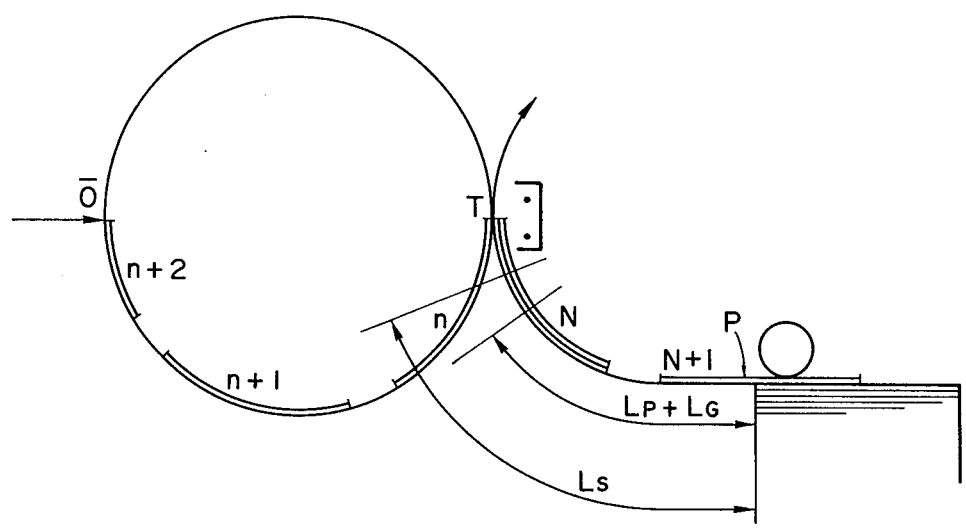
Figure 9:
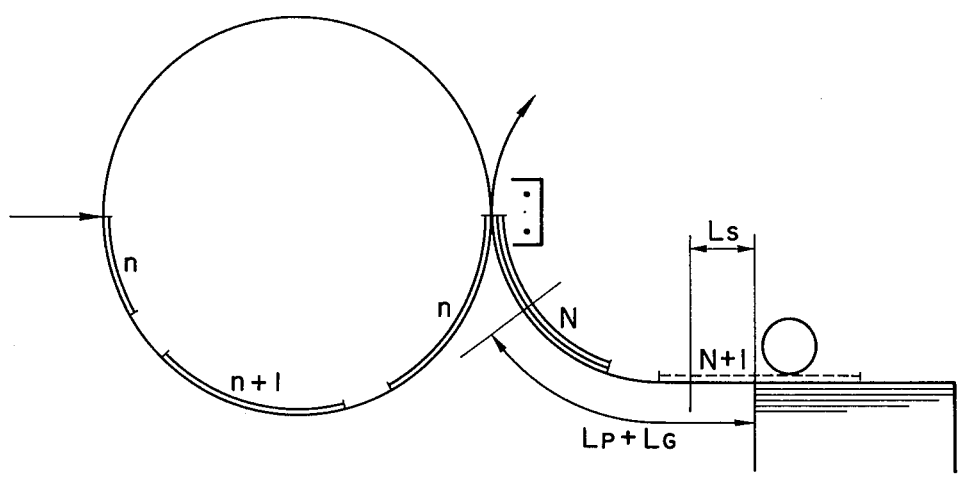
Figure 12:
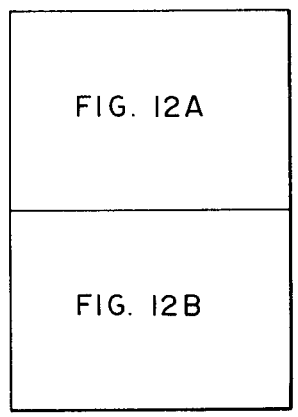
Figure 12B:
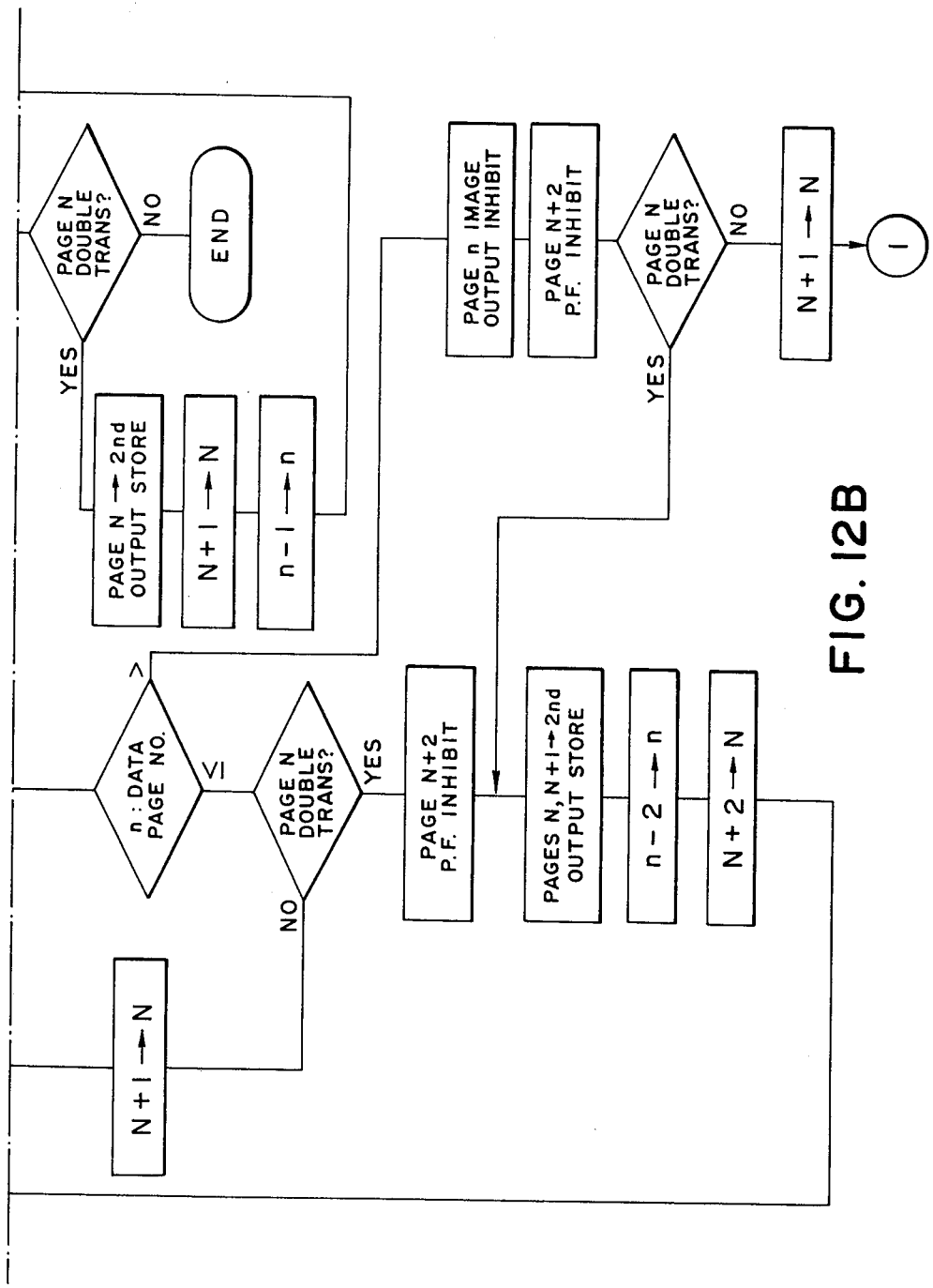
Figure 16:
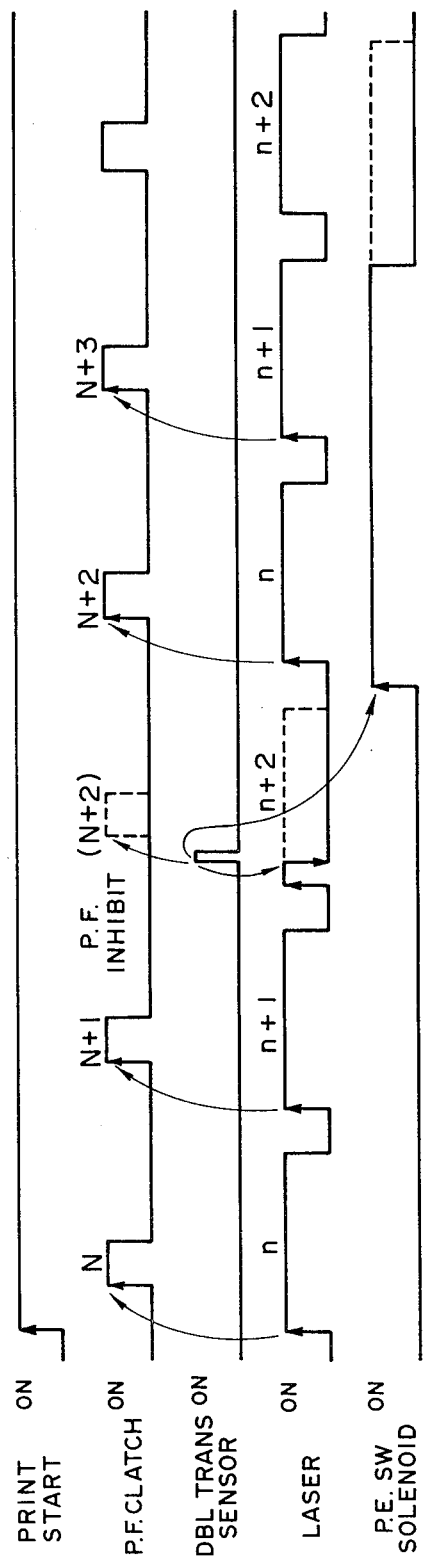

The model view of the conveying path which satisfies the relation $L_1 > L_2$ is shown in FIGS. 8 and 9. In this case, as has been described hereinabove, the timing of writing the image on the photosensitive drum is earlier than the timing of feeding the sheet. FIG. 8 shows a case wherein the relation $L_P + L_G \leq L_S$ is satisifed. FIG. 12 shows the control flow chart for the case shown in FIG. 8, and FIG. 16 shows the timing chart when a double transfer occurs at the Nth sheet. In this case, when the Nth sheet is double-transferred, the information on the (n+2)th page is already being written on the photosensitive drum 14. Furthermore, since the (N+1)th sheet is already fed, the Nth and (N+1)th sheets must be exhausted to the second output tray 46 so as to prevent the dropout of the page and the disturbance of the page order. In order to accomplish this, at the leading edge of the double transfer sensor 101 (47), the permission signal PS goes to low level in the similar manner as described above, so that the video signal VS may not be output to the A/O modulator 111 (3). Since the transfer of the information on the (n+2)th page is not necessary, the feeding of the (N+2)th sheet is inhibited. When the photosensor 36 senses the double-transferred sheet after the leading edge of the output signal from the double transfer sensor 101 (47), the drive signal is supplied to the switching circuit 104 from the CPU 100 to switch the paper exhaust switching plate 44, so that the Nth and (N+1)th sheets are exhausted to the second output tray 46. The control is performed thereafter to write the information on the photosensitive drum 14 starting from the nth page. More specifically, at the timing at which the information on the (n+3)th page is output in the normal sequence, the information on the nth page is written on the photosensitive drum 14 and the (N+2)th sheet is fed at a predetermined time (feeding time of the (N+3)th sheet in the normal sequence). After the transfer of the image on the (N+2)th sheet, the sheet is exhausted to the first output tray 43.

Figure 13:
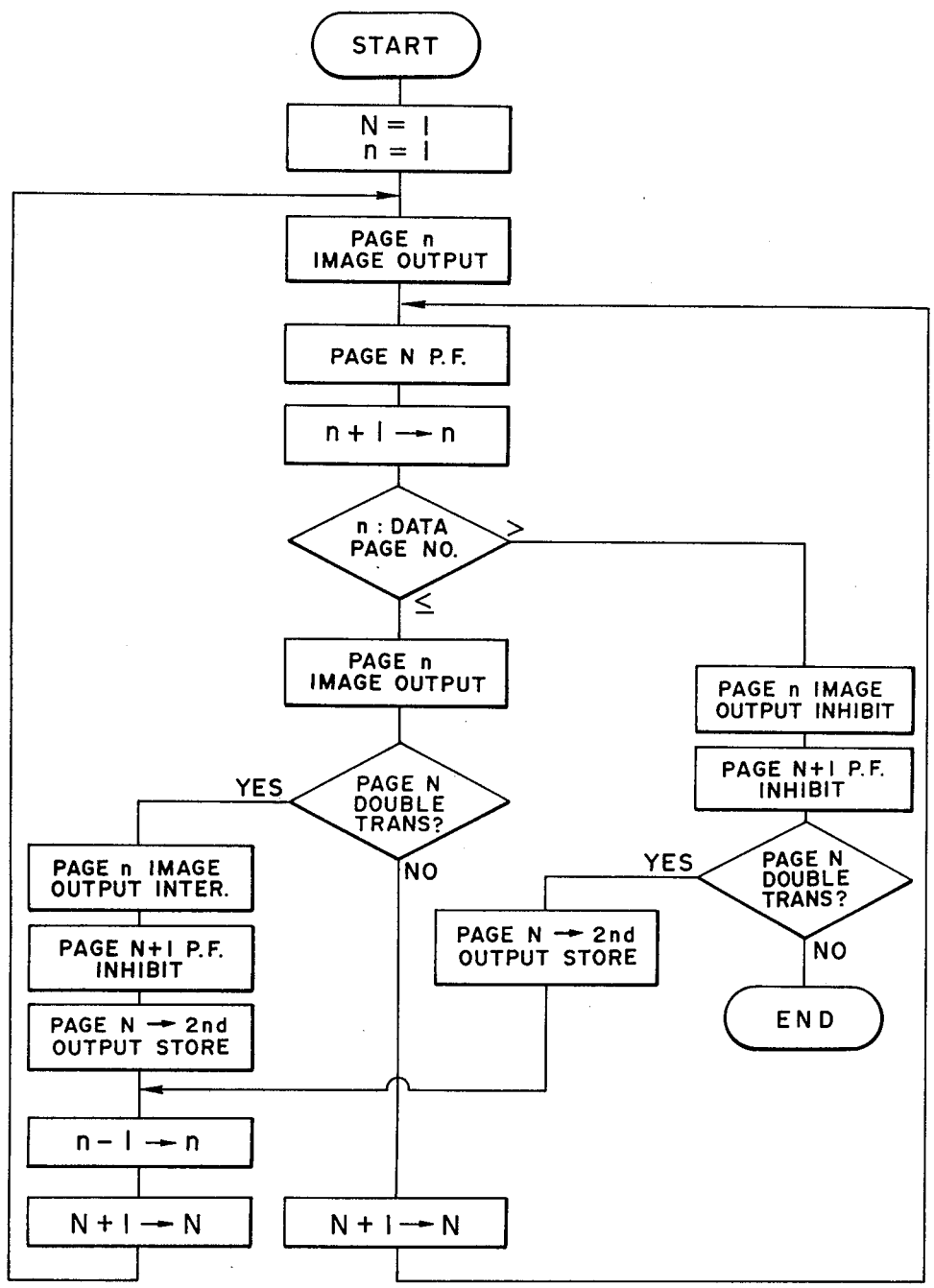
Figure 17:
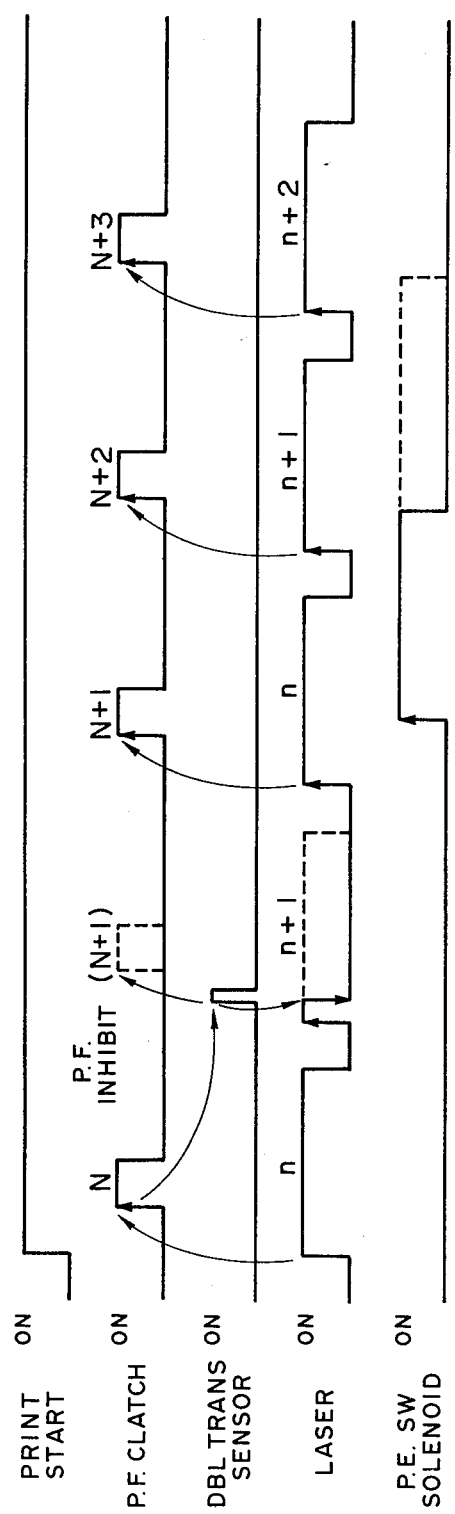

FIG. 9 shows a case wherein the relation $L_P + L_G > L_S$ is satisfied. The control flow chart of the Nth sheet is shown in FIG. 13, and the timing chart when the Nth sheet is double-transferred is shown in FIG. 17. At the time when the Nth sheet is detected to be double-transferred, the information on the (n+1)th page is already being written on the photosensitive drum 14 but the (N+1)th sheet is not yet fed. Therefore, the control is performed so that the feeding operation of the (N+1)th sheet is inhibited and the Nth sheet alone is exhausted to the second output tray 46. At the leading edge of the output signal from the double transfer sensor 101 (47), the permission signal PS goes to low level in the manner as described above, so that the video signal VS may not be supplied to the A/O modulator 111 (3). The feeding operation on the (N+1)th sheet is also inhibited. Then, at the time at which the information on the (n+2)th page is written on the photosensitive drum 14 in the normal sequence, the information on the nth page is written on the photosensitive drum 14. At the time at which the (N+2)th sheet is fed in the normal sequence, the (N+1)th sheet is fed. The information on the nth page is thus transferred to the (N+1)th sheet and the sheet is exhausted to the first output tray 43. Thereafter, the information on the (n+1)th page is output. When the photosensor 36 senses a double-transferred sheet after the detection of the double transfer, the drive signal from the CPU 100 turns on the paper exhaust solenoid 107, and the Nth sheet is exhausted to the second output tray 46.

The description has been made with reference to the case of a double transfer. However, similar control operation is performed when a ramp of the sheet is detected. In this case, a ramp sensor 147 is arranged as shown in FIG. 1-2 in place of the double-transfer sensor 47 shown in FIG. 1—1. When two sensors arranged perpendicularly to the direction of paper feeding do not sense the sheet within a predetermined period of time, the sensors thereby detect a ramp. In FIG. 1-2, the same reference numerals denote the same parts as in FIG. 1—1. FIG. 3-2 is a block diagram showing the control circuitry of the arrangement shown in FIG. 1-2. In FIG. 3-2, the same reference numerals denote the same parts as in FIG. 3-1. A ramp sensor 201 corresponds to the ramp sensor 147 shown in FIG. 1-2. The signal output from the ramp sensor 201 is amplified by an amplifier 202, and amplified signal is supplied to a comparator 203 for comparison and is input to the CPU 100. In response to the detection signal, the control as in the case of the double transfer indicated in the flow charts shown in FIGS. 12 and 13 and the timing charts shown in FIGS. 16 and 17 is performed.

In summary, according to the present invention, unnecessary feeding of the sheets is eliminated when a double transfer or a ramp is detected, and the dropout of the page or disturbance of the order of pages is prevented.

Since the image is formed without interruption of the operation of the recording apparatus, the decrease in the throughput of the apparatus may be reduced to the minimum.

What we claim is:
1. A recording apparatus comprising:
image-forming means for forming an electorstatic latent image on a photosensitive body at an image writing position according to image information, for visualizing the electrostatic latent image, and for transferring the visualized image onto a transfer medium at an image transfer position;
a storing section for storing transfer media;
means for conveying transfer media along a conveying path from said storing section to the transfer position of said image-forming means;
sensing means, disposed at a predetermined position in the conveying path of the transfer media from said storing section to the image transfer position, for sensing abnormal conveyance of a transfer me- dium which does not necessarily require interruption of the operation of said recording apparatus;

a stacking section for receiving unnecessary transfer media; and controlling means for conveying to said stacking section the transfer medium is fed in the conveying path from said storing section to the predetermined position before said sensing means senses the abnormal conveyance.

2. An apparatus according to claim 1, wherein the abnormal conveyance is a double sheet transfer.

3. An apparatus according to claim 1, wherein the abnormal conveyance is a ramp sheet transfer.

4. An apparatus according to claim 1, wherein said sensing means senses the abnormal conveyance of an Nth transfer medium, said controlling means conveys the Nth and (N+1)th transfer media to said stacking section if relations $L_1 \leq L_2$ and $L_P + L_G \leq L_S$ are satisfied, where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

5. An apparatus according to claim 1, wherein when said sensing means senses the abnormal conveyance of the Nth transfer medium, said controlling means conveys the Nth transfer medium to said stacking means if relations $L_1 \leq L_2$ and $L_P + L_G > L_S$ are satisifed, where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

6. An apparatus according to claim 1, wherein said sensing means senses the abnormal conveyance of the Nth transfer medium, said controlling means conveys the Nth and (N+1)th media to said stacking means if relations $L_1 > L_2$ and $L_P + L_G \leq L_S$ are satisifed, where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

7. An apparatus according to claim 6, wherein said controlling means inhibits feeding of the (N+2)th transfer medium.

8. An apparatus according to claim 1, wherein when said sensing means senses the abnormal conveyance of the Nth transfer medium, said controlling means conveys the Nth transfer medium to said stacking means if relations $L_1 > L_2$ and $L_P + L_G > L_S$ are satisfied, where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

9. An apparatus according to claim 8, wherein said controlling means inhibits feeding of the (N+1)th transfer medium.

10. A recording apparatus comprising:
(a) image-forming means for forming an electrostatic latent image on a photosensitive body at an image writing position according to image information, for visualizing the electrostatic latent image, and for transferring the visualized image onto a trnasfer medium at an image transfer position;
(b) a storing section for storing transfer media;
(c) means for conveying transfer media along a conveying path from said storing section to the transfer position of said image-forming means;
(d) sensing means, disposed at a predetermined position in the conveying path of the transfer media from said storing section to the image transfer position, for sensing abnormal conveyance of a transfer medium which does not necessarily require interruption of the operation of said recording apparatus; and
(e) controlling means for, upon sensing of the abnormal conveyance by said sensing means, forming the electrostatic latent image which is to be normally formed on the transfer medium involved in the abnormal conveyance, on a transfer medium which is fed from said storing section after sensing of the abnormal conveyance.

11. An apparatus according to claim 10, wherein the abnormal conveyance is a double sheet transfer.

12. An apparatus according to claim 10, wherein the abnormal conveyance is a ramp sheet transfer.

13. An apparatus according to claim 10, wherein when said sensing means senses the abnormal conveyance of Nth transfer medium, said controlling means controls said image-forming means so that the electrostatic latent image which is to be normally formed on the Nth transfer medium may be formed on the (N+2)th transfer medium if relations $L_1 \leq L_2$ and $L_P + L_G \leq L_S$ are satisfied where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

14. An apparatus according to claim 13, wherein when the abnormal conveyance is sensed, said controlling means stops image-forming operation of said image-forming means on said photosensitive body by image information which is to be transferred to the Nth transfer medium.

15. An apparatus according to claim 10, wherein said controlling means controls said image-forming means so that image information which is to be normally transferred to the Nth transfer medium is transferred to the (N+1)th transfer medium if relations $L_1 \leq L_2$ and $L_P + L_G > L_S$ are satisfied, where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

16. An apparatus according to claim 15, wherein when abnormal conveyance is sensed, said controlling means stops image-forming operation on said photosensitive body of image information which is to be normally transferred to the Nth transfer medium.

17. An apparatus according to claim 10, wherein when said sensing means senses the abnormal conveyance of the Nth transfer medium, said controlling means controls said image-forming means so that image information which is to be normally transferred to the Nth transfer medium is transferred to the (N+3)th transfer medium if relations $L_1 > L_2$ and $L_P + L_G \leq L_S$ are satisfied, where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

18. An apparatus according to claim 17, wherein when the abnormal conveyance is sensed, said controlling means stops image forming operation on said photosensitive body of image information which is to be normally transferred to the (N+2th) transfer medium.

19. An apparatus according to claim 17, wherein said controlling means inhibits feeding of (N+2)th transfer medium.

20. An apparatus according to claim 10, wherein when said sensing means senses the abnormal conveyance of the Nth transfer medium, said controlling means controls said image-forming means so that image information which is to be normally transferred to the Nth transfer medium is transferred to the (N+2)th transfer medium if relations $L_1 > L_2$ and $L_P + L_2 > L_S$ are satisfied, where $L_1$ is a distance between the image writing position and the image transfer position, $L_2$ is a distance between a leading end of transfer media at said storing section and the image transfer position, $L_P$ is a length of the transfer medium along a direction of conveying movement thereof, $L_G$ is a feeding distance between transfer media, and $L_S$ is a distance between the leading end of the transfer media and said sensing means.

21. An apparatus according to claim 20, wherein said controlling means stops writing operation on said photosensitive body of image information which is to be normally transferred to the (N+1)th transfer medium.

22. An apparatus according to claim 20, wherein said controlling means inhibits feeding of the (N+1)th transfer medium.

23. A recording apparatus comprising:
 (a) image-forming means for forming an electrostatic latent image on a photosensitive body at an image writing position according to image information, for visualizing the electrostatic latent image, and for transferring the visualized image onto a transfer medium at an image transfer position;
 (b) a storing section for storing transfer media;
 (c) means for conveying transfer media along a conveying path from said storing section to the transfer position of said image-forming means;
 (d) a sensing means, disposed at a predetermined position in the conveying path of the transfer media from said storing section to the image transfer position, for sensing abnormal conveyance of a transfer medium which does not necessarily require interruption of the operation of said recording apparatus, said conveying path being longer than a distance between the image writing position and the image transfer position along said photosensitive body; and
 (e) controlling means for feeding the transfer medium from said storing section at a normal timing even if said sensing means senses the abnormal conveyance.

24. An apparatus according to claim 23, wherein the abnormal conveyance is a double sheet transfer.

25. An apparatus according to claim 23, wherein the abnormal is a ramp sheet transfer.

26. A recording apparatus comprising:
 (a) image-forming means for forming an electrostatic latent image on a photosensitive body at an image writing position according to image information, for visualizing the electrostatic latent image, and for transferring the visualized image onto a transfer medium at an image transfer position;
 (b) a storing section for storing transfer media;
 (c) means for conveying transfer media along a conveying path from said storing section to the transfer position of said image forming means;
 (d) sensing means, disposed at a predetermined position in the conveying path of the transfer media from said storing section to the image transfer position, for sensing an abnormal conveyance of a transfer medium which does not necessarily require interruption of the operation of said recording apparatus, said conveying path being shorter than a distance between the image writing position and the image transfer position along said photosensitive body; and
 (e) controlling means for temporarily inhibiting feeding of the transfer medium from said storing section without stopping operation of said recording apparatus when said sensing means senses an abnormal conveyance, and thereafter restarting feeding of transfer media from said storing section at a predetermined timing.

27. An apparatus according to claim 26, wherein the abnormal conveyance is a double sheet transfer.

28. An apparatus according to claim 26, wherein the abnormal conveyance is a ramp sheet transfer.

29. A recording apparatus comprising:
 recording means for recording an image on a recording medium at a recording position;
 storing means for storing recording media;
 means for conveying recording media from said storing means to said recording means along a conveying path;
 sensing means disposed at a predetermined position in the conveying path of the recording media from said storing means to a recording position of said recording means, for sensing abnormal conveyance of a recording medium which does not necessarily require interruption of the operation of said recording apparatus; and
 control means responsive to sensing of abnormal conveyance by said sensing means for controlling said recording means to form image information, which is to be recorded on the recording medium abnormally conveyed, on another recording medium conveyed from said storing means after sensing of the abnormal conveyance by said sensing means.

30. A recording apparatus according to claim 29 wherein the abnormal conveyance is a double sheet transfer.

31. A recording apparatus according to claim 29 wherein the abnormal conveyance is a ramp sheet transfer.

32. A recording apparatus according to claim 29 wherein said recording means includes a photosensitive member on which an electrostatic latent image is formed, said latent image being transferred to a recording medium after development.

* * * * *

UNITED STATES PATENT AND TRADEMARK OFFICE
CERTIFICATE OF CORRECTION

PATENT NO. : 4,466,006
DATED : August 14, 1984
INVENTOR(S) : YUJI TAKAHASHI, ET AL.

It is certified that error appears in the above-identified patent and that said Letters Patent is hereby corrected as shown below:

Column 2, line 36, change "miror" to --mirror--.

Column 5, line 64, change " $\leq$ " to -- $>$ --.

Column 9, line 6, between "medium" and "is" insert --which--.

Column 10, line 11, change "trnasfer" to --transfer--.

Column 11, line 26, change "(N+2th)" to -- (N+2)th --.

Signed and Sealed this

Seventeenth Day of September 1985

[SEAL]

Attest:

DONALD J. QUIGG

Attesting Officer

Commissioner of Patents and
Trademarks—Designate